United States Patent
Shigemitsu et al.

(10) Patent No.: US 8,422,147 B2
(45) Date of Patent: Apr. 16, 2013

(54) IMAGE PICKUP LENS AND IMAGE PICKUP MODULE

(75) Inventors: Norimichi Shigemitsu, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/432,566

(22) Filed: Mar. 28, 2012

(65) Prior Publication Data

US 2012/0257289 A1 Oct. 11, 2012

(30) Foreign Application Priority Data

Apr. 5, 2011 (JP) ................................ 2011-084048

(51) Int. Cl.
*G02B 3/02* (2006.01)
*G02B 9/04* (2006.01)

(52) U.S. Cl.
USPC .......................................... 359/717; 359/795

(58) Field of Classification Search .................. 359/717, 359/793, 795
See application file for complete search history.

(56) References Cited

U.S. PATENT DOCUMENTS

| | | | |
|---|---|---|---|
| 5,418,356 A | 5/1995 | Takano | |
| 5,739,965 A | 4/1998 | Ohno | |
| 6,122,009 A | 9/2000 | Ueda | |
| 6,744,570 B1 | 6/2004 | Isono | |
| 7,436,604 B1 | 10/2008 | Tang | |
| RE40,638 E | 2/2009 | Saito | |
| 7,688,523 B2 | 3/2010 | Sano | |
| 7,755,854 B2 | 7/2010 | Sano | |
| 7,764,442 B2 | 7/2010 | Teraoka | |
| 7,852,573 B2 | 12/2010 | Teraoka et al. | |
| 7,957,076 B2 | 6/2011 | Tang | |
| 2001/0003494 A1 | 6/2001 | Kitagawa | |
| 2003/0048549 A1 | 3/2003 | Sato | |
| 2003/0063396 A1 | 4/2003 | Saito | |
| 2003/0184883 A1 | 10/2003 | Sato et al. | |
| 2003/0197956 A1 | 10/2003 | Yamakawa | |
| 2004/0047274 A1 | 3/2004 | Amanai | |
| 2004/0105173 A1 | 6/2004 | Yamaguchi | |
| 2004/0160680 A1 | 8/2004 | Shinohara | |
| 2004/0189854 A1 | 9/2004 | Tsukamoto et al. | |
| 2004/0228009 A1 | 11/2004 | Kama | |
| 2005/0002117 A1 | 1/2005 | Ninomiya et al. | |
| 2005/0041306 A1 | 2/2005 | Matsuo | |
| 2005/0068640 A1 | 3/2005 | Sato | |

(Continued)

FOREIGN PATENT DOCUMENTS

CN 1892279 A 1/2007
CN 2890966 Y 4/2007

(Continued)

OTHER PUBLICATIONS

U.S. Appl. No. 12/833,313, filed Jul. 9, 2010, Norimichi Shigemitsu et al.

(Continued)

*Primary Examiner* — Jack Dinh
(74) *Attorney, Agent, or Firm* — Nixon & Vanderhye, P.C.

(57) ABSTRACT

The present invention provides an image pickup lens including first and second lenses each of which has an Abbe number of greater than 45, which image pickup lens is configured to satisfy the following inequalities (1) and (2):

$$-0.62 < f/f2 < -0.55 \quad (1)$$

$$f/EPD < 3.6 \quad (2)$$

where f is the focal length of an entire image pickup lens system, f2 is the focal length of the second lens, and EPD is entrance pupil diameter of the entire image pickup lens system.

4 Claims, 10 Drawing Sheets

U.S. PATENT DOCUMENTS

| | | |
|---|---|---|
| 2005/0073753 A1 | 4/2005 | Sato |
| 2005/0073754 A1 | 4/2005 | Sato |
| 2005/0105194 A1 | 5/2005 | Matsui |
| 2005/0128597 A1 | 6/2005 | Amanai |
| 2006/0209429 A1 | 9/2006 | Sato et al. |
| 2006/0238898 A1 | 10/2006 | Shinohara |
| 2007/0008625 A1 | 1/2007 | Park et al. |
| 2007/0010122 A1 | 1/2007 | Wang |
| 2007/0070518 A1 | 3/2007 | Muratani et al. |
| 2007/0127141 A1 | 6/2007 | Saito |
| 2007/0127142 A1 | 6/2007 | Saito |
| 2007/0133108 A1 | 6/2007 | Saito |
| 2008/0043346 A1 | 2/2008 | Sano |
| 2008/0080028 A1 | 4/2008 | Bakin et al. |
| 2008/0174879 A1 | 7/2008 | Chen |
| 2008/0180816 A1 | 7/2008 | Nakamura |
| 2008/0239138 A1 | 10/2008 | Sano |
| 2008/0303919 A1 | 12/2008 | Egawa |
| 2009/0009889 A1 | 1/2009 | Teraoka |
| 2009/0015944 A1 | 1/2009 | Taniyama |
| 2009/0059392 A1 | 3/2009 | Sano |
| 2009/0086017 A1 | 4/2009 | Miyano |
| 2009/0257133 A1 | 10/2009 | Sano |
| 2009/0290234 A1 | 11/2009 | Sano |
| 2010/0046096 A1 | 2/2010 | Hirao et al. |
| 2010/0091387 A1 | 4/2010 | Hirao et al. |
| 2010/0097711 A1 | 4/2010 | Saito |
| 2010/0103533 A1 | 4/2010 | Taniyama |
| 2010/0134903 A1 | 6/2010 | Hirao et al. |
| 2010/0134905 A1 | 6/2010 | Hirao et al. |
| 2010/0166413 A1 | 7/2010 | Hirao et al. |
| 2010/0181691 A1 | 7/2010 | Yoshida |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2011/0007195 A1 | 1/2011 | Fukuta |
| 2011/0013290 A1 | 1/2011 | Shigemitsu et al. |
| 2011/0032410 A1 | 2/2011 | Shigemitsu et al. |
| 2011/0061799 A1 | 3/2011 | Wang |
| 2011/0069212 A1 | 3/2011 | Shigemitsu et al. |
| 2011/0085071 A1 | 4/2011 | Shigemitsu et al. |
| 2011/0169995 A1 | 7/2011 | Shigemitsu et al. |
| 2011/0205641 A1 | 8/2011 | Shih |
| 2011/0249171 A1 | 10/2011 | Shigemitsu et al. |
| 2011/0255177 A1 | 10/2011 | Suzuki et al. |
| 2011/0267709 A1 | 11/2011 | Hirao et al. |
| 2011/0304764 A1 | 12/2011 | Shigemitsu et al. |
| 2011/0310495 A1 | 12/2011 | You |

FOREIGN PATENT DOCUMENTS

| | | |
|---|---|---|
| CN | 101266329 A | 9/2008 |
| CN | 201273959 Y | 7/2009 |
| JP | 59-022009 A | 2/1984 |
| JP | 61-057918 A | 3/1986 |
| JP | 4-191716 A | 7/1992 |
| JP | 7-5358 | 1/1995 |
| JP | 8-334684 | 12/1996 |
| JP | 9-284617 | 10/1997 |
| JP | 10-104491 | 4/1998 |
| JP | 10-170809 A | 6/1998 |
| JP | 2001-221904 A | 8/2001 |
| JP | 2002-098885 A | 4/2002 |
| JP | 2002-296496 | 10/2002 |
| JP | 2003-029115 A | 1/2003 |
| JP | 2003-057538 A | 2/2003 |
| JP | 2003-270526 A | 9/2003 |
| JP | 2003-329922 A | 11/2003 |
| JP | 2004-4620 | 1/2004 |
| JP | 2004-064460 A | 2/2004 |
| JP | 2004-88713 A | 3/2004 |
| JP | 2004-145183 | 5/2004 |
| JP | 2004-226487 A | 8/2004 |
| JP | 2004-246168 | 9/2004 |
| JP | 2004-246169 | 9/2004 |
| JP | 2004-252067 | 9/2004 |
| JP | 2004-254259 | 9/2004 |
| JP | 2004-301938 A | 10/2004 |
| JP | 2005-018306 | 1/2005 |
| JP | 2005-24581 A | 1/2005 |
| JP | 2005-24889 A | 1/2005 |
| JP | 2005-107254 | 4/2005 |
| JP | 2005-107368 | 4/2005 |
| JP | 2005-107369 | 4/2005 |
| JP | 2005-157154 A | 6/2005 |
| JP | 2005-286536 | 10/2005 |
| JP | 2006-178026 A | 7/2006 |
| JP | 2006-293324 A | 10/2006 |
| JP | 2006-317916 A | 11/2006 |
| JP | 2007-065374 A | 3/2007 |
| JP | 2007-93972 | 4/2007 |
| JP | 2007-155821 A | 6/2007 |
| JP | 2007-156030 A | 6/2007 |
| JP | 2007-156031 A | 6/2007 |
| JP | 2007-212878 A | 8/2007 |
| JP | 2007-293176 A | 11/2007 |
| JP | 2008-33376 A | 2/2008 |
| JP | 2008-46526 A | 2/2008 |
| JP | 2008-76594 A | 4/2008 |
| JP | 2008-107616 A | 5/2008 |
| JP | 2008-185880 A | 8/2008 |
| JP | 2008-242180 A | 10/2008 |
| JP | 2008-281873 A | 11/2008 |
| JP | 2008-309999 | 12/2008 |
| JP | 2009-14899 A | 1/2009 |
| JP | 2009-018578 A | 1/2009 |
| JP | 2009-20182 A | 1/2009 |
| JP | 2009-023353 A | 2/2009 |
| JP | 2009-47836 A | 3/2009 |
| JP | 2009-53592 A | 3/2009 |
| JP | 2009-80413 A | 4/2009 |
| JP | 2009-98492 A | 5/2009 |
| JP | 2009-151113 A | 7/2009 |
| JP | 2009-157402 A | 7/2009 |
| JP | 2009-251515 A | 10/2009 |
| JP | 2009-251516 A | 10/2009 |
| JP | 2009-258286 A | 11/2009 |
| JP | 2009-282223 A | 12/2009 |
| JP | 2010-72032 A | 4/2010 |
| JP | 2010-101942 | 5/2010 |
| JP | 2010-102162 A | 5/2010 |
| JP | 2010-151935 | 7/2010 |
| JP | 2011-107631 A | 6/2011 |
| TW | 200703636 A | 1/2007 |
| WO | WO2009/025275 | 2/2009 |
| WO | WO 2009/116492 | 9/2009 |

OTHER PUBLICATIONS

U.S. Appl. No. 12/849,257, filed Aug. 3, 2010, Norimichi Shigemitsu et al.
U.S. Appl. No. 12/899,763, filed Oct. 7, 2010, Norimichi Shigemitsu et al.
U.S. Appl. No. 12/887,639, filed Sep. 22, 2010, Norimichi Shigemitsu et al.
U.S. Appl. No. 13/005,877, filed Jan. 13, 2011, Norimichi Shigemitsu et al.
U.S. Appl. No. 13/053,943, filed Mar. 22, 2011, Norimichi Shigemitsu et al.
U.S. Appl. No. 13/159,755, filed Jun. 14, 2011, Norimichi Shigemitsu et al.
Office Action mailed Apr. 26, 2012 in U.S. Appl. No. 12/833,313.
U.S. Office Action mailed Aug. 8, 2012 in U.S. Appl. No. 13/053,943.
U.S. Office Action mailed Sep. 7, 2012 in U.S. Appl. No. 12/833,313.
Office Action mailed Oct. 2, 2012 in U.S. Appl. No. 12/849,257.

DESIGN DATA ; IMAGE PICKUP LENS 100

| Components | | Materials | | Curvature | Thickness | Semi-Diameter | Aspheric coefficient | | | | | | | | |
|---|---|---|---|---|---|---|---|---|---|---|---|---|---|---|---|
| | | Nd | νd | [mm⁻¹] | [mm] | [mm] | Conic | A4 | A6 | A8 | A10 | A12 | A14 | A16 |
| L1 | S1 | 1.498 | 46 | 1.38561266 | 0.583 | 0.473 | 0.00000000 | 0.00697711 | 0.20690012 | -0.84037891 | 4.70940984 | 26.18850551 | -328.49381131 | 841.57483913 |
| | S2 | | | 0.56564915 | 0.409 | 0.455 | 0.00000000 | 0.57777793 | -2.81109764 | 28.24491824 | -64.09995193 | 69.44458707 | -1027.70633562 | 5699.22908405 |
| L2 | S3 | 1.498 | 46 | -0.40428753 | 1.287 | 0.534 | 0.00000000 | -0.51667195 | -2.51860199 | 13.77468375 | -46.39713207 | -24.87514013 | 388.30389114 | -1060.29693717 |
| | S4 | | | 0.01767235 | 0.336 | 1.316 | 0.00000000 | 0.19817383 | -1.28669181 | 2.59188780 | -2.91142262 | 1.83240243 | -0.60661814 | 0.08154512 |
| CG | front | 1.516 | 64 | 0.00000000 | 0.300 | 0.000 | 0.00000000 | 0.00000000 | 0.00000000 | 0.00000000 | 0.00000000 | 0.00000000 | 0.00000000 | 0.00000000 |
| | rear | | | 0.00000000 | 0.050 | 0.000 | 0.00000000 | 0.00000000 | 0.00000000 | 0.00000000 | 0.00000000 | 0.00000000 | 0.00000000 | 0.00000000 |

FIG. 12

DESIGN DATA ; IMAGE PICKUP LENS 200

| Components | | Materials | | Curvature [mm⁻¹] | Thickness [mm] | Semi-Diameter [mm] | Aspheric coefficient | | | | | | | |
|---|---|---|---|---|---|---|---|---|---|---|---|---|---|---|
| | | Nd | νd | | | | Conic | A4 | A6 | A8 | A10 | A12 | A14 | A16 |
| L1 | S1 | 1.498 | 46 | 1.35603463 | 0.567 | 0.476 | 0.00000000 | 0.00652969 | 0.35878463 | -0.80310597 | -1.70217611 | 35.46630767 | -183.90434535 | 420.83613730 |
| | S2 | | | 0.55948388 | 0.419 | 0.461 | 0.00000000 | 0.53907892 | -2.87869231 | 28.89572371 | -61.19769585 | -63.36950546 | -15.74612367 | 2766.81173428 |
| L2 | S3 | 1.498 | 46 | -0.34668805 | 1.330 | 0.547 | 0.00000000 | -0.40998358 | -2.69720060 | 13.79387639 | -39.87286196 | -33.83580103 | 338.21799308 | -707.39110891 |
| | S4 | | | 0.00352499 | 0.347 | 1.328 | 0.00000000 | 0.22963331 | -1.30518322 | 2.59978508 | -2.91171650 | 1.83211762 | -0.60674364 | 0.08190041 |
| CG | front | 1.516 | 64 | 0.00000000 | 0.300 | 0.000 | 0.00000000 | 0.00000000 | 0.00000000 | 0.00000000 | 0.00000000 | 0.00000000 | 0.00000000 | 0.00000000 |
| | rear | | | 0.00000000 | 0.050 | 0.000 | 0.00000000 | 0.00000000 | 0.00000000 | 0.00000000 | 0.00000000 | 0.00000000 | 0.00000000 | 0.00000000 |

FIG. 13

|  |  |  | IMAGE PICKUP LENS 100 | IMAGE PICKUP LENS 200 |
|---|---|---|---|---|
| Sensor | Size [mm] | Diagonal | 3.500 | 3.500 |
|  |  | Horizontal | 2.800 | 2.800 |
|  |  | Vertical | 2.100 | 2.100 |
|  | Pixel pitch [μm] |  | 1.75 | 1.75 |
| F number |  |  | 2.80 | 2.80 |
| Focal length [mm] |  |  | 2.650 | 2.663 |
| Field of view [deg] | Diagonal |  | 65.0 | 65.0 |
|  | Horizontal |  | 54.1 | 54.0 |
|  | Vertical |  | 41.7 | 41.6 |
| Optical distortion [%] | h0.6 |  | 2.1 | 2.3 |
|  | h0.8 |  | 1.8 | 2.0 |
|  | h1.0 |  | 1.8 | 1.8 |
| TV distortion [%] |  |  | −0.16 | −0.24 |
| Relative illumination [%] | h0.6 |  | 72.9 | 72.6 |
|  | h0.8 |  | 63.0 | 62.5 |
|  | h1.0 |  | 43.9 | 44.6 |
| CRA [deg] | h0.6 |  | 24.8 | 24.6 |
|  | h0.8 |  | 26.6 | 26.6 |
|  | h1.0 |  | 26.5 | 26.4 |
| Optical length [mm] |  |  | 2.966 | 3.014 |
| CG thickness [mm] |  |  | 0.300 | 0.300 |
| Hyper focal distance [mm] |  |  | 1433 | 1448 |

- Object distance 1200mm
- Design wave weight
  404.66nm=0.13, 435.84nm=0.49, 486.1327nm=1.57,
  546.07nm=3.12, 587.5618nm=3.18, 656.2725nm=1.51

FIG. 14

|  | IMAGE PICKUP LENS 100 | IMAGE PICKUP LENS 200 |
|---|---|---|
| f1; FOCAL LENGTH OF FIRST LENS [mm] | 2.054 | 2.125 |
| f2; FOCAL LENGTH OF SECOND LENS [mm] | -4.700 | -5.695 |
| f; FOCAL LENGTH OF ENTIRE IMAGE PICKUP LENS SYSTEM [mm] | 2.650 | 2.663 |
| EPD; ENTRANCE PUPIL DIAMETER [mm] | 0.946 | 0.951 |
| f1/f | 0.8 | 0.8 |
| f2/f1 | -2.3 | -2.7 |
| f/f2 | -0.6 | -0.5 |
| f/EPD | 2.8 | 2.8 |

FIG. 15

IMAGE PICKUP LENS AND IMAGE PICKUP MODULE

This Nonprofessional application claims priority under 35 U.S.C. §119(a) on Patent Application No. 2011-084048 filed in Japan on Apr. 5, 2011, the entire contents of which are hereby incorporated by reference.

TECHNICAL FIELD

The present invention relates to an image pickup lens and an image pickup module each of which is for use in, for example, portable terminals.

BACKGROUND ART

Various image pickup modules, each of which includes a solid-state image pickup device such as a CCD (Charge Coupled Device) or a CMOS (Complementary Metal Oxide Semiconductor) etc., have been developed. Specific examples of the image pickup modules include compact digital cameras and compact digital camcorders etc. In particular, image pickup modules for use in portable terminals (personal digital assistant and mobile phones etc.), which have come into widespread use in recent years, are required to produce high-resolution images and to be small in size and low in height.

A technique of reducing the size and height of an image pickup lens for use in an image pickup module, which is for reducing the size and height of the image pickup module, is attracting attention. Patent Literatures 1 to 3 disclose specific examples of such a technique.

Patent Literature 1 discloses an image pickup lens constituted by a lens system including an aperture diaphragm, a first lens, and a second lens arranged in this order from an object side. The first lens is a meniscus lens (i) whose surface facing toward the object has a convex shape and (ii) which has positive refractive power. The second lens has two concave surfaces. Each of the first and second lenses has at least one aspheric surface. In addition, the image pickup lens satisfies the following conditions:

$$0.6 < f1/f < 1.0 \quad (A)$$

$$1.8 < (n1-1)f/r1 < 2.5 \quad (B)$$

where f is the focal length of the lens system (image pickup lens), f1 is the focal length of the first lens, n1 is the refractive index of the first lens, and r1 is the curvature radius of an object side surface of the first lens.

Patent Literature 2 discloses an image pickup lens constituted by an aperture diaphragm, a first lens, and a second lens arranged in this order from an object side to an image surface side. The first lens is a meniscus-shaped lens (i) whose convex surface faces toward the object and (ii) which has positive refractive power. The second lens has (a) two concave surfaces and (b) negative refractive power. The image pickup lens satisfies the following conditions (C) through (F):

$$0.8 < v1/v2 < 1.2 \quad (C)$$

$$50 < v1 \quad (D)$$

$$1.9 < d1/d2 < 2.8 \quad (E)$$

$$-2.5 < f2/f1 < 1.5 \quad (F)$$

where
v1 is the Abbe number of the first lens,
v2 is the Abbe number of the second lens,
d1 is the thickness of the first lens at its center,
d2 is a distance from the image side surface of the first lens image surface to the object side surface of the second lens,
f1 is the focal length of the first lens, and
f2 is the focal length of the second lens.

Patent Literature 3 discloses an image pickup lens constituted by an aperture diaphragm, a first lens, and a second lens arranged in this order from an object side to an image surface side. The first lens is a meniscus-shaped lens (i) whose convex surface faces toward the object and (ii) which has positive refractive power. The second lens has (a) two concave surfaces and (b) negative refractive power. The image pickup lens satisfies the following conditions (G) and (H):

$$-2.5 < f2/f1 < -0.8 \quad (G)$$

$$0.8 < v1 < v2 < 1.2 \quad (H)$$

where
f1 is the focal length of the first lens,
f2 is the focal length of the second lens,
v1 is the Abbe number of the first lens, and
v2 is the Abbe number of the second lens.

CITATION LIST

Patent Literatures

Patent Literature 1
Japanese Patent Application Publication, Tokukai, No. 2006-178026 A (Publication Date: Jul. 6, 2006)
Patent Literature 2
Japanese Patent Application Publication, Tokukai, No. 2008-309999 A (Publication Date: Dec. 25, 2008)
Patent Literature 3
Japanese Patent Application Publication, Tokukai, No. 2009-251516 A (Publication Date: Oct. 29, 2009)

SUMMARY OF INVENTION

Technical Problem

According to the image pickup lens disclosed in Patent Literature 1, the focal length of an entire image pickup lens system is defined by the condition (B) for the purpose of achieving a high-resolution image pickup lens which is small in size and low in height.

Note, however, that even if the focal length of the entire image pickup lens system does not satisfy the condition (B), it is possible to achieve a high-resolution image pickup lens which is small in size and low in height.

According to the image pickup lens disclosed in Patent Literature 2, the focal lengths of the first and second lenses are defined by the condition (F) for the purpose of achieving a high-resolution image pickup lens which is small in size and low in height.

Note, however, that even if the focal lengths of the first and second lenses do not satisfy the condition (F), it is possible to achieve a high-resolution image pickup lens which is small in size and low in height.

According to the image pickup lens disclosed in Patent Literature 3, the focal lengths of the first and second lenses are defined by the condition (G) for the purpose of achieving a high-resolution image pickup lens which is small in size and low in height.

Note, however, that even if the focal lengths of the first and second lenses do not satisfy the condition (G), it is possible to achieve a high-resolution image pickup lens which is small in size and low in height.

The present invention has been made in view of the foregoing problem, and it is an object of the present invention to provide an image pickup lens and an image pickup module each of which (i) is high-resolution, (ii) has a wide angle of view, and (iii) is small in size and low in height.

Solution to Problem

In order to attain the above object, an image pickup lens of the present invention includes: lenses; and an aperture diaphragm, the number of the lenses being two, one of the lenses being a first lens and the other being a second lens, the aperture diaphragm, the first lens, and the second lens being arranged in this order from an object side to an image surface side, the first lens (i) having positive refractive power and (ii) being a meniscus lens whose surface facing toward the object has a convex shape, the second lens (a) having negative refractive power and (b) being a lens whose surface facing toward the object has a concave shape and whose surface facing toward the image surface is configured such that a central part has a concave shape and a peripheral part surrounding the central part has a convex shape, and each of the first and second lenses being configured such that a surface facing toward the object and a surface facing toward the image surface are both aspheric and having an Abbe number of greater than 45, said image pickup lens being configured to satisfy the following inequalities (1) and (2):

$$-0.62 < f/f2 < -0.55 \quad (1)$$

$$f/EPD < 3.6 \quad (2)$$

where f is focal length of an entire image pickup lens system, f2 is focal length of the second lens, and EPD is entrance pupil diameter of the entire image pickup lens system.

According to the configuration, the power (refractive power, absolute value) of the second lens of the image pickup lens is limited to small values so that the inequality (1) is satisfied. This makes it possible even for the image pickup lens having a wide angle of view to achieve good contrast in the edges of the image.

On the other hand, if the refractive power of the second lens is too small, it may be necessary to increase the thickness of the second lens, and to increase a distance between (i) the second lens and (ii) the first lens and/or the image surface. In other words, if the refractive power of the second lens is too small, the total length of the optical system of the image pickup lens 1 becomes too long. If this is the case, it may be difficult to reduce the size and height of the image pickup lens.

In view of such circumstances, according to the configuration, the refractive power of the second lens is limited to small, but not too small, values so that the inequality (1) is satisfied. This makes it possible to reduce the size and height of the image pickup lens.

According to the configuration, since the inequality (2) is satisfied, the aperture size of the image pickup lens is large. This makes it possible to form a bright image.

It should be noted here that the bright image, which is achieved by satisfying the inequality (2), has an aberration larger than that in a dark image.

In view of this, according to the configuration, (i) the inequality (1) is satisfied, and further (ii) the Abbe numbers of the first lens and of the second lens are both greater than 45. The Abbe number is a constant for an optical medium, which is indicative of a ratio of refractivity to dispersion of light. Specifically, the Abbe number means to what degree different wavelengths of light are refracted toward different directions. A medium having a high Abbe number does not cause much light dispersion that is due to refraction of different wavelengths of light.

Since the first lens and the second lens each have an Abbe number of greater than 45, the image pickup lens is capable of sufficiently correcting a chromatic aberration. This makes it possible to obtain a clear image with little blurring.

Further, according to the configuration, it is possible to achieve a high-resolution image pickup lens which is small in size and low in height even if the condition(s) (B), (F), and/or (G) are/is not satisfied.

Further, an image pickup module of the present invention includes: an image pickup lens of the present invention; and an image pickup device which receives light representing an image formed by the image pickup lens.

According to the configuration, the image pickup module brings about the same effect as its including image pickup lens. This makes it possible to achieve an inexpensive, compact, and high-performance digital camera.

ADVANTAGEOUS EFFECTS OF INVENTION

As described above, an image pickup lens of the present invention includes: lenses; and an aperture diaphragm, the number of the lenses being two, one of the lenses being a first lens and the other being a second lens, the aperture diaphragm, the first lens, and the second lens being arranged in this order from an object side to an image surface side, the first lens (i) having positive refractive power and (ii) being a meniscus lens whose surface facing toward the object has a convex shape, the second lens (a) having negative refractive power and (b) being a lens whose surface facing toward the object has a concave shape and whose surface facing toward the image surface is configured such that a central part has a concave shape and a peripheral part surrounding the central part has a convex shape, and each of the first and second lenses being configured such that a surface facing toward the object and a surface facing toward the image surface are both aspheric and having an Abbe number of greater than 45, said image pickup lens being configured to satisfy the following inequalities (1) and (2):

$$-0.62 < f/f2 < -0.55 \quad (1)$$

$$f/EPD < 3.6 \quad (2)$$

where f is focal length of an entire image pickup lens system, f2 is focal length of the second lens, and EPD is entrance pupil diameter of the entire image pickup lens system.

As such, the present invention makes it possible to achieve an image pickup lens and an image pickup module each of which (i) produces high-resolution images, (ii) has a wide angle of view, and (iii) is small in size and low in height.

BRIEF DESCRIPTION OF DRAWINGS

FIG. 1

FIG. 2

FIG. 3

FIG. 4

FIG. 5

FIG. 6

(a) of FIG. 6 is a graph showing astigmatism caused by the image pickup lens shown in FIG. 1. (b) of FIG. 6 shows distortion caused by the image pickup lens shown in FIG. 1.

FIG. 7

FIG. 8

FIG. 9

FIG. 10

(a) of FIG. 10 shows astigmatism caused by the image pickup lens shown in FIG. 2.(b) of FIG. 10 shows distortion caused by the image pickup lens shown in FIG. 2.

FIG. 11

FIG. 12

FIG. 13

FIG. 14

FIG. 15

DESCRIPTION OF EMBODIMENTS

[Embodiment 1]

Figure 1:
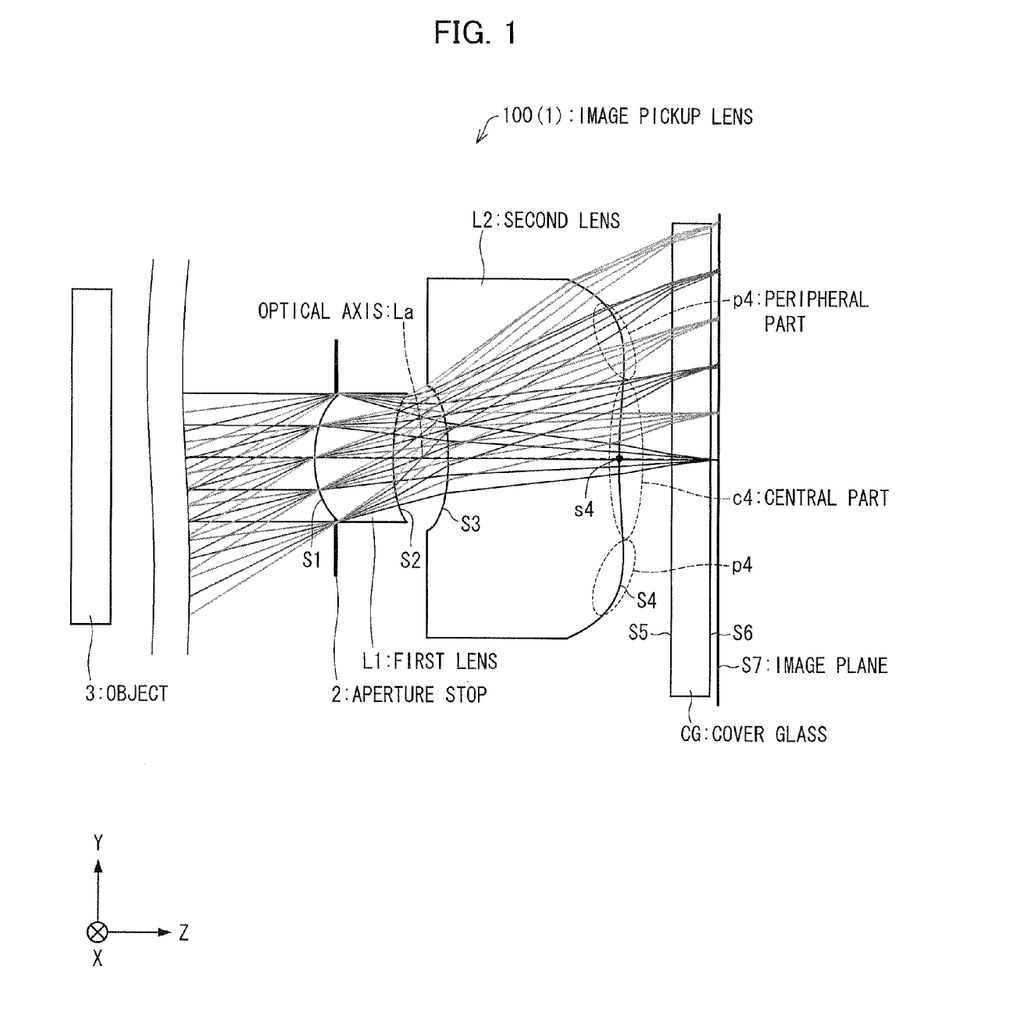
FIG. 1 is a cross-sectional view showing a configuration of an image pickup lens in accordance with an embodiment of the present invention.
Figure 2:
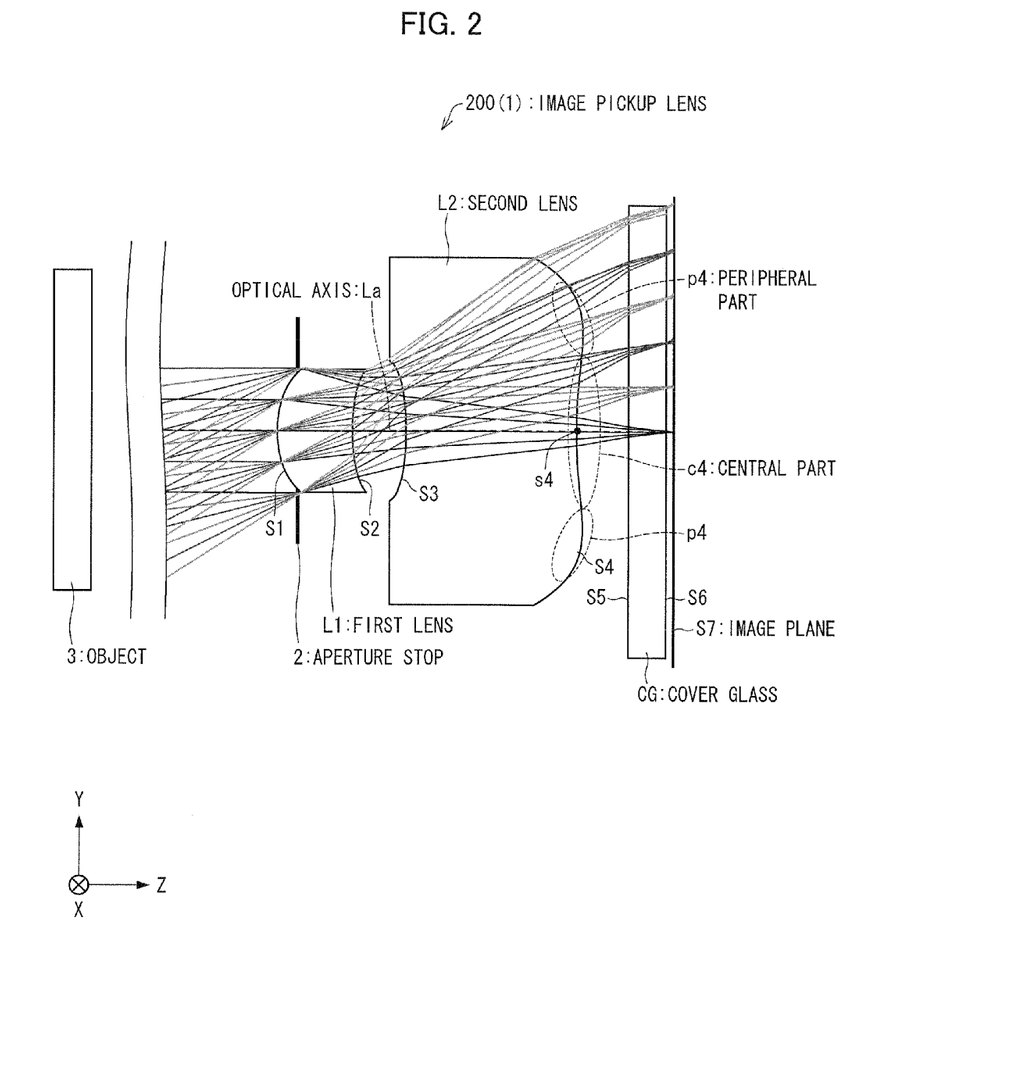
FIG. 2 is a cross-sectional view showing a configuration of an image pickup lens in accordance with a comparative example of the present invention.

Embodiments of the present invention discuss, with reference to FIGS. 1 and 2, an image pickup lens 100 and an image pickup lens 200. FIG. 1 shows a cross-sectional view of the image pickup lens 100. FIG. 2 shows a cross-sectional view of the image pickup lens 200. The image pickup lens 100 is an image pickup lens in accordance with an embodiment of the present invention, which satisfies the inequalities (1) and (2) (described later). On the other hand, the image pickup lens 200 is a comparative example of the image pickup lens 100, and satisfies only the inequality (2).

The image pickup lens 100 and the image pickup lens 200 are hereinafter collectively referred to as an "image pickup lens 1."

(Basic Configuration of Image Pickup Lens 1)

In each of the cross-sectional views in FIG. 1 and FIG. 2, an X direction (a direction normal to the surface of a sheet on which FIGS. 1 and 2 are illustrated), a Y direction (a vertical direction of the sheet), and a Z direction (a horizontal direction of the sheet) are defined.

Specifically, the Z direction is a direction in which an optical axis La of the image pickup lens 1 extends. The Y direction is one of the directions that are normal to the optical axis La. The Z direction and the Y direction are perpendicular to each other. The X direction is perpendicular to both the Z direction and the Y direction.

As to the image pickup lens 1, the Z direction is (i) a direction from a side on which an object 3 is provided (this side is referred to as an object 3 side) to a side on which an image surface S7 is provided (this side is referred to as an image surface S7 side) and (ii) a direction from the image surface S7 side to the object 3 side.

The image pickup lens 1 is configured such that an aperture diaphragm 2, a first lens L1 (one of the two lenses), a second lens L2 (the other of the two lenses), and a cover glass CG are arranged in this order from the object 3 side to the image surface S7 side. The image pickup lens 1 has two lenses: the first lens L1 and the second lens L2.

The first lens L1 has a surface S1 facing toward the object 3 (such a surface is referred to as an object side surface) and a surface S2 facing toward the image surface S7 (such a surface is referred to as an image surface side surface). The second lens L2 has a surface S3 facing toward the object 3 and a surface S4 facing toward the image surface S7.

In the same manner as in the first lens L1 and the second lens L2, the cover glass CG has a surface S5 facing toward the object 3 and a surface S6 facing toward the image surface S7.

The aperture diaphragm 2 is provided so as to surround an effective aperture of the surface S1 of the first lens L1. The aperture diaphragm 2 is provided in order to limit the diameter of an on-axis beam of light having entered the image pickup lens 1 so that the light can properly pass through the first lens L1 and the second lens L2.

The object 3 is an object whose image is to be formed by the image pickup lens 1. In other words, the object 3 is an object whose image is to be taken (formed) by the image pickup lens 1. For convenience, in the drawings, the object 3 lies very close to the image pickup lens 1. Note, however, that the object 3 can be away from the image pickup lens 1 at a distance of 100 mm or greater.

The first lens L1 has positive refractive power, and is a well-known meniscus lens whose surface S1 facing toward the object 3 is a convex surface (has a convex shape). Accordingly, the surface S2, of the first lens L1, which faces toward the image surface S7 is a concave surface (has a concave shape) of the meniscus lens.

It is preferable that the first lens L1 be provided such that the top of the convex surface S1 protrudes through the aperture diaphragm 2 toward the object 3 (see FIGS. 1 and 2). This makes it possible to cause an entrance pupil of the image pickup lens 1 to be closer to the image surface S7, and thus makes it easy to achieve a telecentric property of the image pickup lens 1. Hence, it is possible to properly correct aberrations, and to achieve an image pickup lens 1 which is small in size and low in height.

The "concave shape" and "concave surface" of a lens each mean a part of the lens which part curves so as to have a hollow center, i.e., a state in which the lens curves inward. On the other hand, the "convex shape" and "convex surface" of a lens each mean a state in which the lens has a sphere-like surface that curves outward.

The second lens L2 has negative refractive power, and its surface S3 facing toward the object 3 has a concave shape.

Further, the surface S4, of the second lens L2, which faces toward the image surface S7 is configured such that (i) a central part c4 corresponding to a center s4 and a part surrounding the central part c4 has a concave shape and (ii) a peripheral part p4 that surrounds the central part c4 has a convex shape. In other words, the surface S4 has a shape having an inflection point that separates the depressed central part c4 and the protruding peripheral part p4. As used herein, the inflection point is a point on the aspheric surface within the effective radius, i.e., a point on a curve obtained when the lens is cut, at which point the tangent to the curve is perpendicular to the optical axis.

According to the image pickup lens 1 having an inflection point on the surface S4, as to the Z direction, it is possible to (i) form an image of a light beam that passes through the central part c4 on a position closer to the object 3 and (ii) form an image of a light beam that passes through the peripheral part p4 on a position closer to the image surface S7. Therefore, the image pickup lens 1 is capable of correcting various aberrations such as field curvature depending on the concave shape of the central part c4 and the convex shape of the peripheral part p4.

The surface S1 and the surface S2 of the first lens L1 are both aspheric. Likewise, the surface S3 and the surface S4 of the second lens L2 are both aspheric. This makes it possible to even more properly correct various aberrations that can occur in the image pickup lens 1, and thus possible to increase contrast at the edges of the image.

Further, the first lens L1 and the second lens L2 both have an Abbe number of greater than 45. The Abbe number is a constant for optical media, which is indicative of a ratio of refractivity to dispersion of light. Specifically, the Abbe number means to what degree different wavelengths of light are refracted toward different directions. A medium having a high Abbe number does not cause much light dispersion that is due to refraction of different wavelengths of light.

Since the first lens L1 and the second lens L2 each have an Abbe number of greater than 45, the image pickup lens 1 is capable of sufficiently correcting chromatic aberrations. This makes it possible to obtain a clear image with little blurring.

The cover glass CG is provided between the second lens L2 and the image surface S7. The cover glass CG is provided so as to protect, by covering the image surface S7, the image surface S7 from physical damage etc.

The image surface S7 is normal to the optical axis La of the image pickup lens 1, and is a surface on which an image is formed. A real image can be viewed on a screen (not illustrated) provided on the image surface S7.

The image pickup lens 1 is configured so as to satisfy the following inequality (2). In particular, the image pickup lens 100 is configured so as to further satisfy the following inequality (1).

$$-0.62 < f/f2 < -0.55 \quad (1)$$

$$f/EPD < 3.6 \quad (2)$$

In the inequalities (1) and (2), f is the focal length of an entire image pickup lens 1 system (entire image pickup lens system), f2 is the focal length of the second lens L2, and EPD is the entrance pupil diameter of the entire image pickup lens 1 system.

The "entire image pickup lens 1 system" means an image pickup lens 1 serving as a single lens system.

The "entrance pupil diameter" is the diameter of an image of an aperture diaphragm (aperture diaphragm 2), which image is formed by a lens provided in front of the aperture surface. The entrance pupil diameter can be described also as the diameter of an image of the aperture diaphragm 2 viewed from a direction of the object 3. In a case of an image pickup lens configured such that an aperture diaphragm is closer to an object than the other members are, the entrance pupil diameter is equal to the diameter of a beam of light that enters the image pickup lens. The image pickup lens 1 is configured such that the aperture diaphragm 2 is closer to the object 3 than the first lens L1 and the second lens L2 are. Therefore, the entrance pupil diameter EPD of the entire image pickup lens 1 system is twice as large as the effective radius of the object side surface of the first lens L1, i.e., the entrance pupil diameter is equal to the diameter of the effective aperture of the surface S1.

According to the image pickup lens 100, the power (refractive power, absolute value) of the second lens L2 is limited to small values so that the inequality (1) is satisfied. This makes it possible even for the image pickup lens 1 having a wide angle of view to achieve good contrast in the edges of the image.

On the other hand, if the refractive power of the second lens L2 is too small, it may be necessary to increase the thickness of the second lens L2 and to increase a distance between (i) the second lens L2 and (ii) the first lens L1 and/or the image surface S7 (or cover glass CG). In other words, if the refractive power of the second lens L2 is too small, the total length of the optical system of the image pickup lens 1 becomes too long. If this is the case, it may be difficult to reduce the size and height of the image pickup lens 1.

In view of such circumstances, according to the image pickup lens 100, the refractive power of the second lens L2 is limited to small, but not too small, values so that the inequality (1) is satisfied. This makes it possible to reduce the size and height of the image pickup lens 1.

Since the image pickup lens 1 satisfies the inequality (2), the aperture of the image pickup lens 1 is large. This makes it possible to form a bright image.

It should be noted here that the bright image, which is achieved by satisfying the inequality (2), has an aberration larger than that in a dark image.

In view of this, the image pickup lens 1 is configured such that (i) the inequality (1) is satisfied and further (ii) the Abbe numbers of the first lens L1 and of the second lens L2 are both greater than 45.

Since the Abbe numbers of the first lens L1 and of the second lens L2 are both greater than 45, the image pickup lens 1 is capable of sufficiently correcting chromatic aberrations. This makes it possible to obtain a clear image with little blurring.

On the other hand, if $f/f2 \leq -0.62$, the refractive power of the second lens L2 is too large. As a result, it becomes difficult for the image pickup lens having a wide angle of view to obtain good contrast at the edges of the image.

If $f/f2 \geq -0.55$, the refractive power of the second lens L2 is too small. As a result, as described earlier, the length of the entire optical system of the image pickup lens becomes long.

If $f/EPD \geq 3.6$, the aperture is too small, and thus an image formed is dark. Note, however, that it is not necessary that an image pickup lens capable of forming a dark image such as those obtained when f/EPD>3.6 satisfy the inequality (2), because such an image pickup lens has a small aberration.

If the Abbe number(s) of the first lens L1 and/or the second lens L2 are/is less than 45, an image formed by such an image pickup lens is blurred to a large extent due to a chromatic aberration. As a result, it becomes difficult to obtain a clear image.

(Optical Characteristics of Image Pickup Lens 100)

Figure 3:
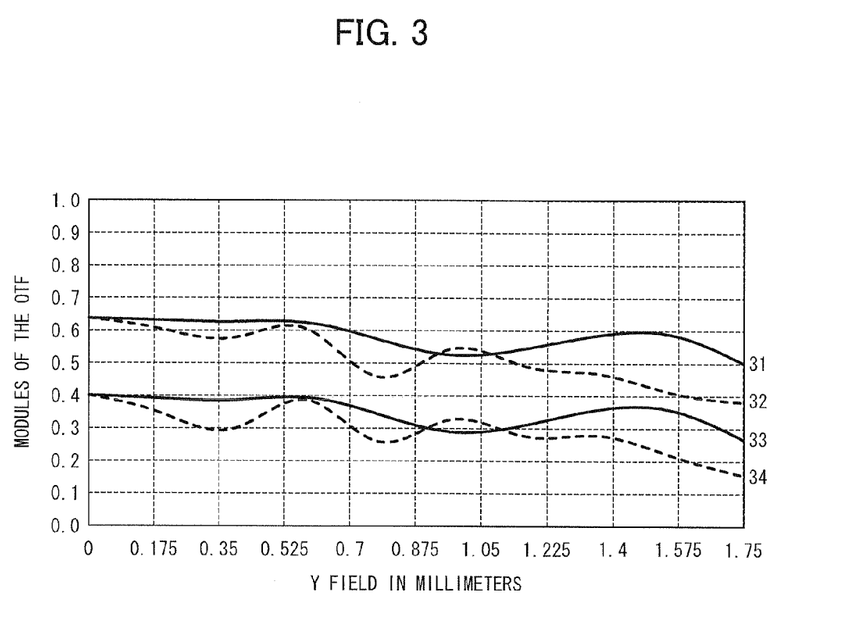
FIG. 3 is a graph showing MTF (Modulation Transfer Function) versus image height for the image pickup lens shown in FIG. 1.

FIG. 3 is a graph showing MTF versus image height for the image pickup lens 100.

Figure 4:
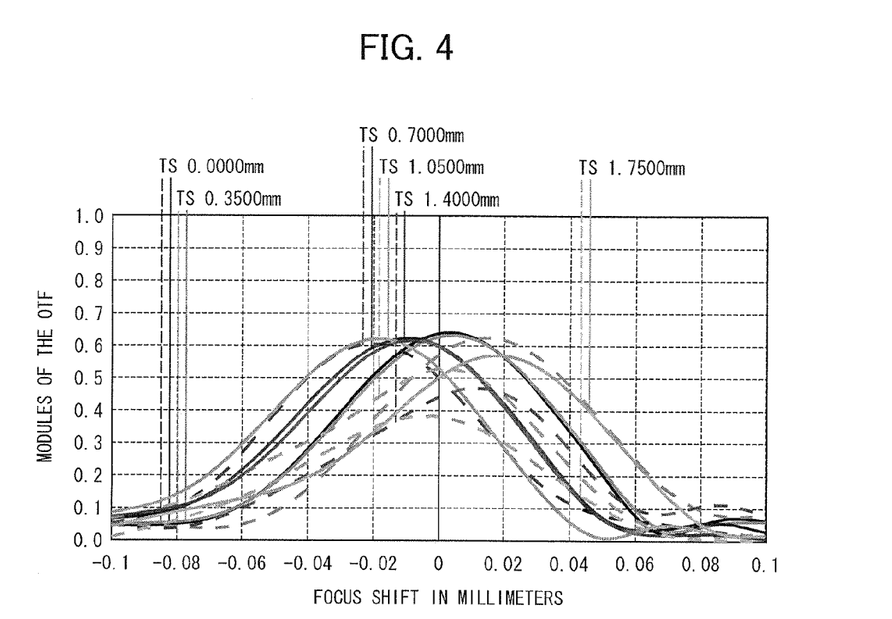
FIG. 4 is a graph showing defocus MTF for the image pickup lens shown in FIG. 1.

FIG. 4 is a graph showing defocus MTF (MTF versus focus shift position) for the image pickup lens 100.

Figure 5:
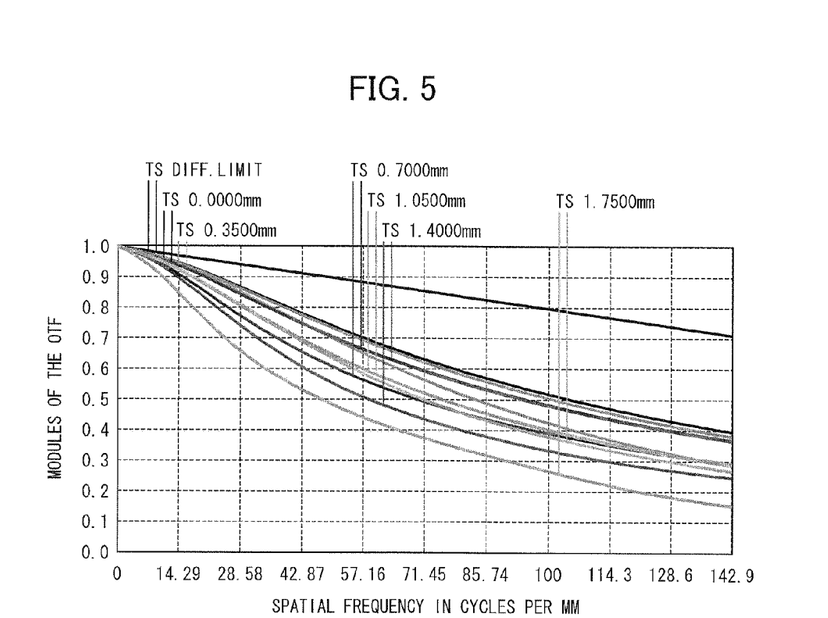
FIG. 5 is a graph showing MTF versus spatial frequency for the image pickup lens shown in FIG. 1

FIG. 5 is a graph showing MTF versus spatial frequency for the image pickup lens 100.

Figure 6:
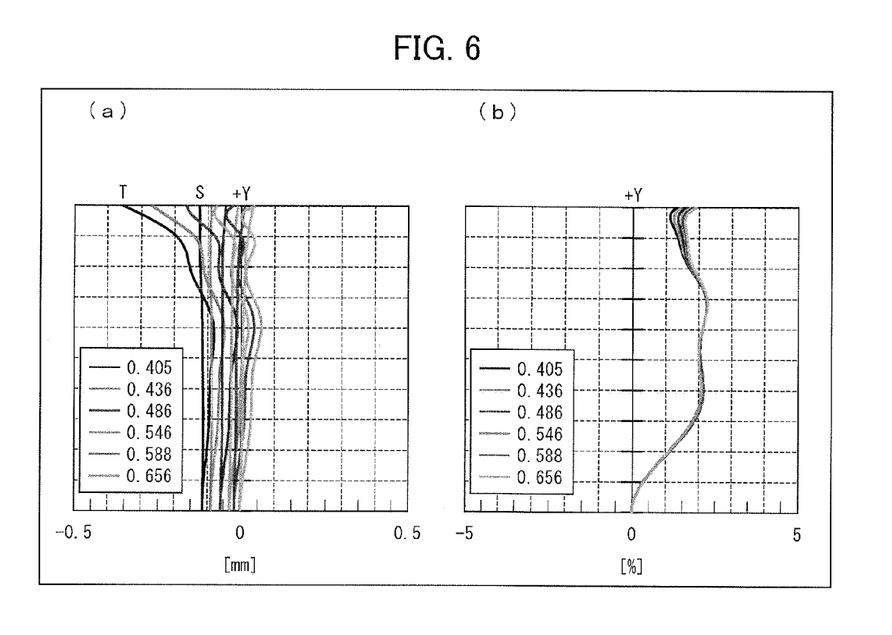

(a) of FIG. 6 is a graph showing astigmatism caused by the image pickup lens 100. (b) of FIG. 6 is a graph showing distortion caused by the image pickup lens 100.

In all of the graphs shown in FIGS. 3 to 5, MTF (there is no unit) is on the vertical axis.

The graph shown in FIG. 3 shows the image height (unit: mm) on the horizontal axis, and shows MTFs in a tangential image surface and in a sagittal image surface for image heights from h0 (0 mm) to h1.0 (1.75 mm). FIG. 3 shows MTFs observed when the spatial frequency is "Nyquist frequency/4 (71.4 lp/mm)", and MTFs observed when the spatial frequency is "Nyquist frequency/2 (142.9 lp/mm)."

The graph shown in FIG. 4 shows the focus shift position (unit: mm) on the horizontal axis, and shows MTFs in a tangential image surface (T) and in a sagittal image surface (S) for image heights of h0, h0.2 (0.35 mm), h0.4 (0.7 mm), h0.6 (1.05 mm), h0.8 (1.4 mm), and h1.0. FIG. 4 shows MTFs observed when the spatial frequency is "Nyquist frequency/4".

The graph shown in FIG. 5 shows the spatial frequency (unit: lp/mm) on the horizontal axis, and shows MTFs in a tangential image surface (T) and in a sagittal image surface (S) for image heights of h0, h0.2, h0.4, h0.6, h0.8, and h1.0. FIG. 5 shows MTFs observed when the spatial frequency is between 0 and "Nyquist frequency/2".

Further, specifically, (a) of FIG. 6 shows the image height (on the vertical axis) versus field curvature (unit: mm) (on the horizontal axis) for the image pickup lens 100. (b) of FIG. 6 shows the image height (on the vertical axis) versus distortion (unit: %) (on the horizontal axis) for the image pickup lens 100.

The MTF (Modulation Transfer Function) is an indicator indicating how contrast of an image formed on an image surface changes as the image surface is moved in an optical axis direction. The larger the MTF, the higher the resolution of the image formed on the image surface. In the following, MTFs equal to or greater than 2.0 are regarded as meaning high resolution.

In the present embodiment, each image height may be represented either by an absolute value (0 mm to 1.75 mm, the maximum height is 1.75 mm) or by a relative value (h0 to h1.0) relative to the maximum height 1 (h1.0). The following are examples of a relation between the absolute and relative values.

0 mm=Image height h0 (center of image)

0.175 mm=Image height h0.1 (equivalent to 10% of the maximum image height starting from the center of the image)

0.35 mm=Image height h0.2 (equivalent to 20% of the maximum image height starting from the center of the image)

0.7 mm=Image height h0.4 (equivalent to 40% of the maximum image height starting from the center of the image)

1.05 mm=Image height h0.6 (equivalent to 60% of the maximum image height starting from the center of the image)

1.4 mm=Image height h0.8 (equivalent to 80% of the maximum image height starting from the center of the image)

1.75 mm=Image height h1.0 (maximum image height)

The Nyquist frequency mentioned above is a value corresponding to the Nyquist frequency of a sensor (image pickup device) that receives light having passed through the image pickup lens 1, and is a value of a resolvable spatial frequency calculated from the pixel pitch of the sensor. Specifically, the Nyquist frequency Nyq. (unit: lp/mm) of the sensor is calculated by the following equation.

$$\text{Nyq.} = 1/(\text{the pixel pitch of the sensor})/2$$

Further, in order to obtain the optical characteristics of the image pickup lens 1, measurements were carried out on the assumption that the object distance was 1200 mm by using, as a simulation light source (not illustrated), white light weighted as below (i.e., controlled so that relative amounts of the wavelengths constituting the white light are as below).

404.66 nm=0.13
435.84 nm=0.49
486.1327 nm=1.57
546.07 nm=3.12
587.5618 nm=3.18
656.2725 nm=1.51

The graphs 31 through 34 shown in FIG. 3 indicate the following measurements. The graph 31 indicates the MTF in the sagittal image surface observed when the spatial frequency is "Nyquist frequency/4". The graph 32 indicates the MTF in the tangential image surface observed when the spatial frequency is "Nyquist frequency/4". The graph 33 indicates the MTF in the sagittal image surface observed when the spatial frequency is "Nyquist frequency/2". The graph 34 indicates the MTF in the tangential image surface observed when the spatial frequency is "Nyquist frequency/2".

Under the conditions corresponding to the graphs 31 through 33, the image pickup lens 100 has an MTF of greater than 0.2 at any image height between h0 and h1.0. Even under the condition corresponding to the graph 34, the image pickup lens 100 has an MTF of greater than 0.2 provided that the image height is between h0 and approximately h0.9 (1.575 mm), and does not show a dramatic decrease in MTF even when the image height is greater than h0.9 (1.575 mm). This means that the image pickup lens 100 has good contrast in the vicinities of the edges of the image (i.e. image height h1.0 and areas surrounding that height).

As shown in FIG. 4, when the focus shift position is 0 mm, the image pickup lens 100 has an MTF of greater than 0.2 (i.e., resolution is high) in both the sagittal image surface and the tangential image surface at any image height between h0 and h1.0. It should be noted that the focus shift position of 0 mm corresponds to the image surface S7 (see FIG. 1).

As is clear from FIG. 5, when the spatial frequency is approximately 120 lp/mm or less, the image pickup lens 100 has an MTF of greater than 2.0 (resolution is high) in both the sagittal image surface and the tangential image surface at any image height between h0 and h1.0. After the spatial frequency exceeds approximately 120 lp/mm, the MTFs become smaller than 0.2. Generally, MTFs at higher image heights (i.e. periphery of image) and MTFs in the tangential image surface become smaller than 0.2 first. Note, however, that even in the case where the MTF is 0.2 or less, the image pickup lens 100 does not show a dramatic decrease in MTF. This means that the image pickup lens 100 has good contrast in the vicinities of the edges of the image.

As is clear from (a) and (b) of FIG. 6, the image pickup lens 100 shows a small residual aberration (there is no significant difference in aberrations in a direction normal to the optical axis La). This means that the image pickup lens 100 has excellent optical characteristics.

(Optical Characteristics of Image Pickup Lens 200)

Figure 7:
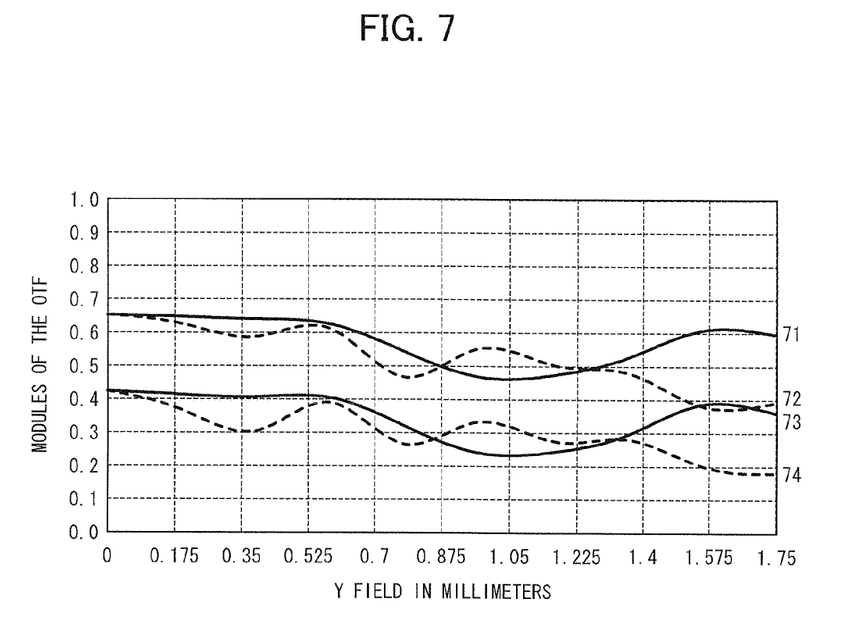
FIG. 7 is a graph showing MTF versus image height for the image pickup lens shown in FIG. 2.

FIG. 7 is a graph showing MTF versus image height for the image pickup lens 200.

Figure 8:
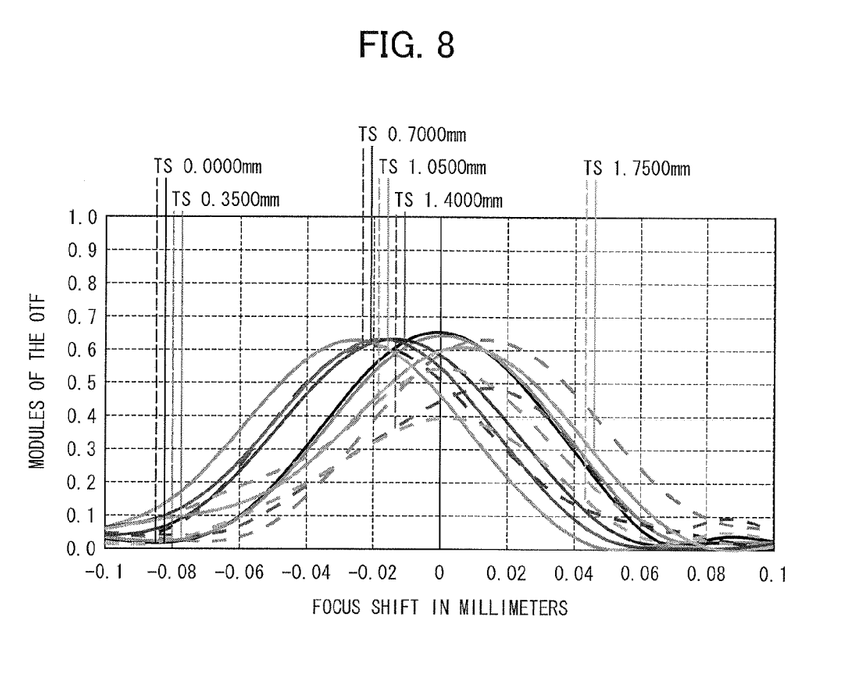
FIG. 8 is a graph showing defocus MTF for the image pickup lens shown in FIG. 2.

FIG. 8 is a graph showing defocus MTF for the image pickup lens 200.

Figure 9:
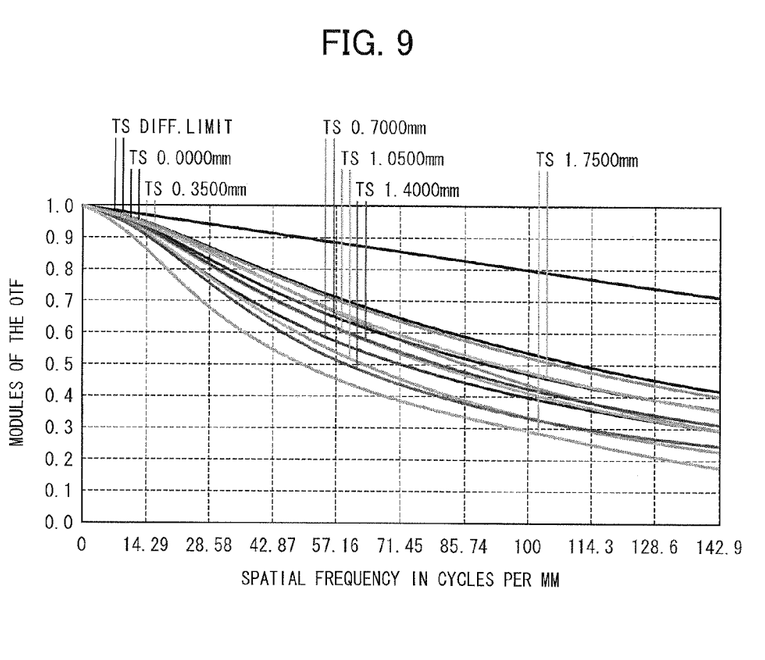
FIG. 9 is a graph showing MTF versus spatial frequency for the image pickup shown in FIG. 2.

FIG. 9 is a graph showing MTF versus spatial frequency for the image pickup lens 200.

Figure 10:
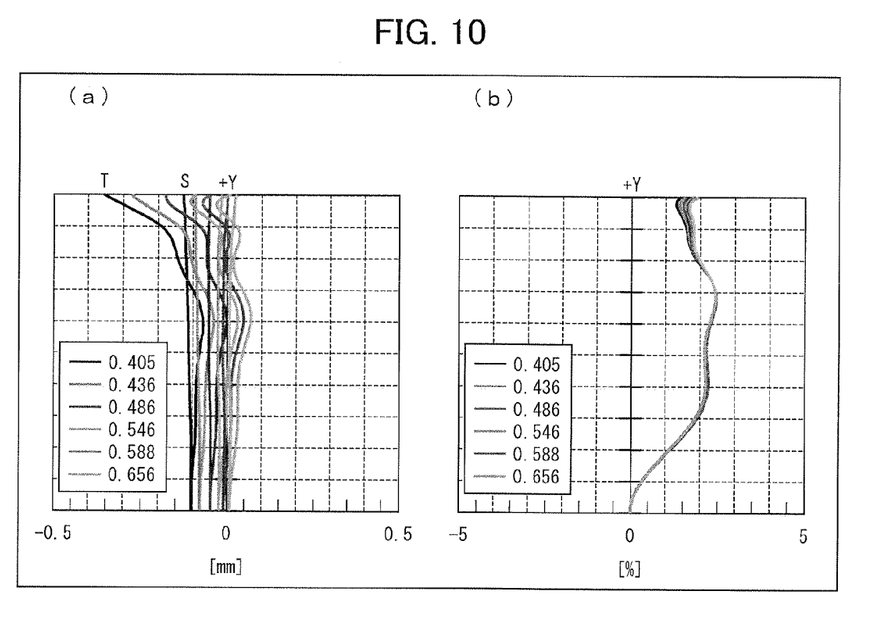

(a) of FIG. 10 is a graph showing astigmatism caused by the image pickup lens 200. (b) of FIG. 10 is a graph showing distortion caused by the image pickup lens 200.

FIGS. 7, 8 and 9 and (a) and (b) of FIG. 10 are the graphs corresponding to those of FIGS. 3, 4 and 5 and (a) and (b) of FIG. 6, respectively, and show optical characteristics of the image pickup lens 200. Since the definitions of the terms and the measurement conditions etc. in this section (Optical Characteristics of Image Pickup Lens 200) are the same as those in the previous section (Optical Characteristics of Image Pickup Lens 100), their details are omitted here.

The graphs 71 through 74 shown in FIG. 7 indicate the following results obtained by measurements. The graph 71 indicates the MTF in the sagittal image surface observed when the spatial frequency is "Nyquist frequency/4". The graph 72 indicates the MTF in the tangential image surface observed when the spatial frequency is "Nyquist frequency/4". The graph 73 indicates the MTF in the sagittal image surface observed when the spatial frequency is "Nyquist frequency/2". The graph 74 indicates the MTF in the tangential image surface observed when the spatial frequency is "Nyquist frequency/2".

Under the conditions corresponding to the graphs 71 through 73, the image pickup lens 200 has an MTF of greater than 0.2 at any image height between h0 and h1.0. Even under the condition corresponding to the graph 74, the image pickup lens 200 has an MTF of greater than 0.2 at any image height between h0 and approximately h0.9, and does not show a dramatic decrease in MTF even when the image height is greater than h0.9. This means that the image pickup lens 200 has good contrast in the vicinity of the image.

As shown in FIG. 8, when the focus shift position is 0 mm, the image pickup lens 200 has an MTF of greater than 0.2 (i.e., resolution is high) in both the sagittal image surface and the tangential image surface at any image height between h0 and h1.0. It should be noted that the focus shift position 0 mm corresponds to the image surface S7 (see FIG. 2).

As is clear from FIG. 9, when the spatial frequency is approximately 130 lp/mm or less, the image pickup lens 100 has an MTF of greater than 2.0 (resolution is high) in both the sagittal image surface and the tangential image surface at any image height between h0 and h1.0. After the spatial frequency exceeds approximately 130 lp/mm, the MTFs become smaller than 0.2. Generally, MTFs at higher image heights (i.e. periphery of image) and MTFs in the tangential image surface become smaller than 0.2 first. Note, however, that even in the case where the MTF is 0.2 or less, the image pickup lens 100 does not show a dramatic decrease in MTF. This means that the image pickup lens 200 has good contrast in the vicinities of the edges of the image.

As is clear from (a) and (b) of FIG. 10, the image pickup lens 200 shows a small residual aberration. This means that the image pickup lens 200 has excellent optical characteristics.

As is clear from FIGS. 3 to 5, (a) and (b) of FIG. 6, FIGS. 7 to 9, and (a) and (b) of FIG. 10, there is no significant difference between the image pickup lens 100 and the image pickup lens 200 in terms of contrast in the vicinities of the edges of an image.

(Design Data of Image Pickup Lens 1)

Figure 11:
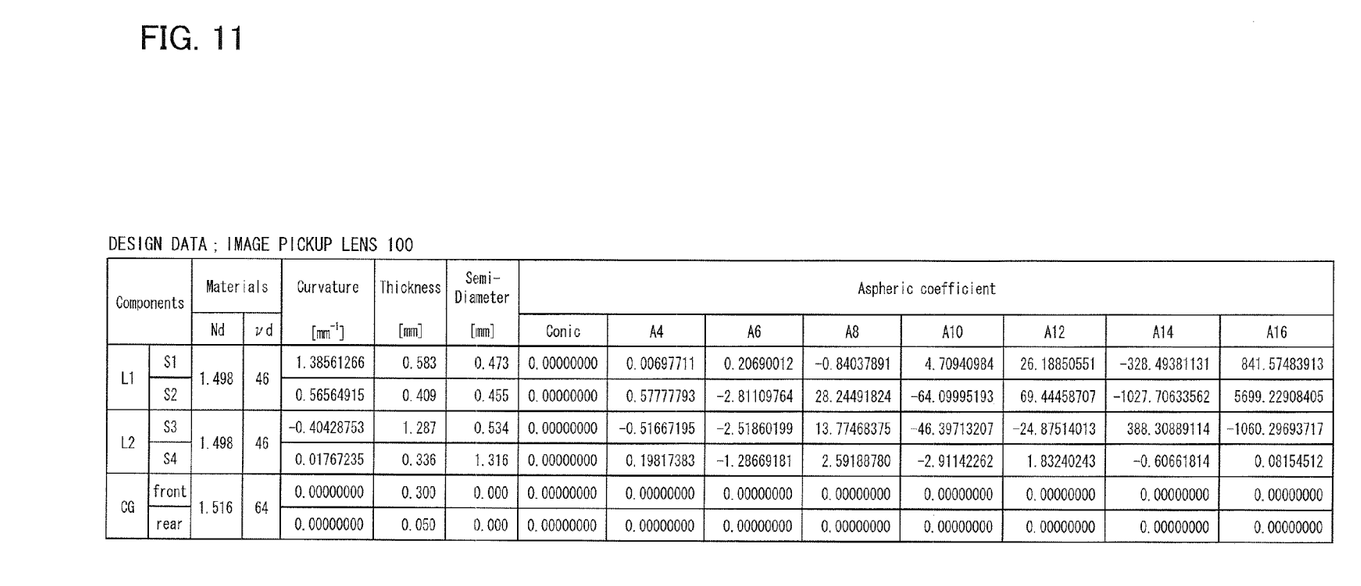
FIG. 11 is a table showing design data of the image pickup lens shown in FIG. 1.

FIG. 11 is a table showing design data of the image pickup lens 100.

Figure 12:
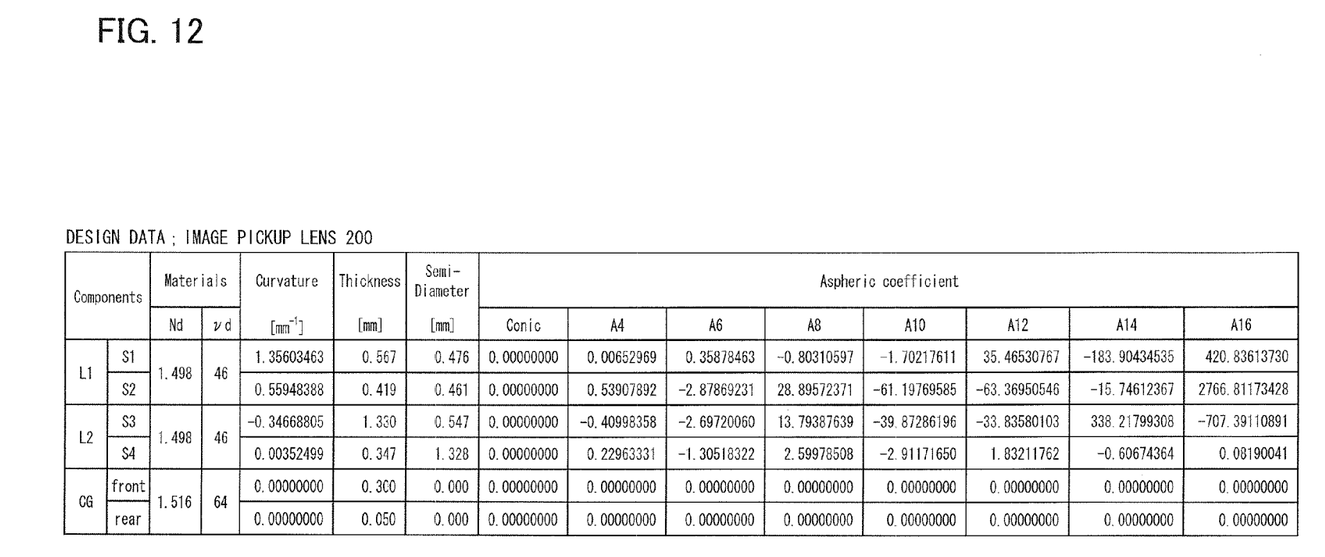
FIG. 12 is a table showing design data of the image pickup lens shown in FIG. 2.

FIG. 12 is a table showing design data of the image pickup lens 200.

The following are definitions of the respective items shown in FIG. 11 and FIG. 12.

"Components": Constituents of the image pickup lens 1. Specifically, "L1" represents the first lens L1, "L2" represents the second lens L2, and "CG" represents the cover glass CG. Further, "S1" through "S4" represent the respective surfaces S1 through S4, and "front" and "rear" represent the surface S5 and the surface S6, respectively.

"Nd (Materials)": Refractive index of each of the constituents of the image pickup lens 1 given for d line (wavelength: 587.6 nm).

"vd (Materials)": Abbe number of each of the constituents of the image pickup lens 1 given for d line.

"Curvature": Refractive index (unit: $mm^{-1}$) of each of the surfaces S1 through S4 of the lenses.

"Thickness": Distance (unit: mm) in the optical axis direction (Z direction), which is from the center of a corresponding surface to the center of an adjacent surface that lies on the image surface S7 side of the corresponding surface. That is, the thickness at the center.

"Semi-Diameter": Effective radius (unit: mm) of each of the surfaces S1 through S4 of the lenses (the radius of a circular region that limits the range of a beam of light).

"Aspheric coefficient": The ith aspheric coefficient $A_i$ (where i is an even number of 4 or greater) in the aspheric equation (3) for defining an aspheric surface, which is given for the surfaces S1 to S4 of the lenses. In the aspheric equation (3), Z is a coordinate on the optical axis (Z direction), x is a coordinate on a line normal to the optical axis (X direction), R is the curvature radius (the inverse of a corresponding curvature), and K is the conic coefficient.

$$Z = \frac{x^2 \times \frac{1}{R}}{1 + \sqrt{1 - (1+K) \times x^2 \times \frac{1}{R^2}}} + \sum_{\substack{i=4 \\ [Even\ Number]}} A_i \times x^i \quad (3)$$

According to each of the image pickup lenses 100 and 200, the first lens L1 and the second lens L2 both have an Abbe number of 46, which is greater than 45.

Further, according to each of the image pickup lenses 100 and 200, both the surfaces S1 and S2 of the first lens L1 are given an aspheric coefficient other than 0. That is, both the surfaces S1 and S2 of the first lens L1 of the image pickup lens 1 are aspheric surfaces. Likewise, according to each of the image pickup lenses 100 and 200, both the surfaces S3 and S4 of the second lens L2 are given an aspheric coefficient other than 0. That is, both the surfaces S3 and S4 of the second lens L2 of the image pickup lens 1 are aspheric surfaces.

(Design Specifications of Image Pickup Lens 1)

Figure 13:
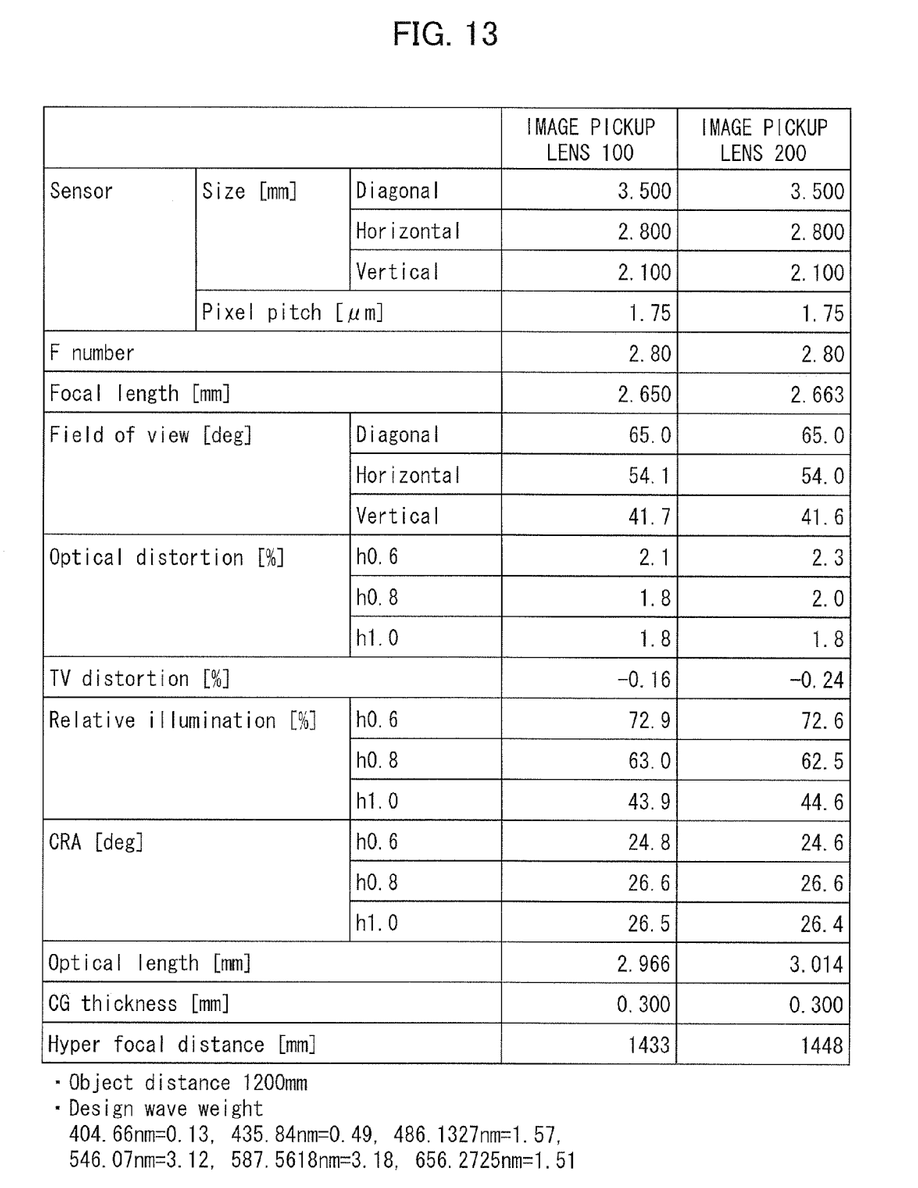
FIG. 13 is a table showing an example of specifications of image pickup modules including the respective image pickup lenses shown in FIGS. 1 and 2.

FIG. 13 is a table showing an example of design specifications of image pickup modules each including the image pickup lens 1.

The following are the definitions of the items shown in FIG. 13.

"Sensor": A sensor applied to each of the image pickup modules.

"Size": Size of the sensor represented in three different values (three dimensions) (unit: mm), i.e., diagonal, horizontal, and vertical.

"Pixel pitch": Pixel pitch of the sensor (unit: μm).

"F number": F number of the image pickup lens 1. The F number of the image pickup lens 1 is obtained by dividing the equivalent focal length of the entire image pickup lens 1 system by the entrance pupil diameter of the entire image pickup lens 1 system.

"Focal length": Focal length f (unit: mm) of the entire image pickup lens 1 system.

[Field of view]: Angle of view (unit: deg. (°)) of the image pickup lens 1 represented in three different values (three dimensions), i.e., diagonal, horizontal, and vertical.

"Optical distortion": Distortion (optical distortion, unit: %) of the image pickup lens 1 at points where image heights are h0.6, h0.8, and h1.0.

"TV distortion": TV distortion (television distortion, unit: %) of the image pickup lens 1.

"Relative illumination": Relative illumination of the image pickup lens 1 at points where image heights are h0.6, h0.8, and h1.0. Relative illumination is the amount (unit: %) of light obtained at a target point relative to the amount of light obtained at the center of the image where the image height is h0.

"CRA (Chief Ray Angle)": Chief ray angle (unit: deg. (°)) at points where image heights are h0.6, h0.8, and h1.0.

"Optical length": Total length (unit: mm) of the optical system of the image pickup lens 1.

"CG thickness": Thickness (unit: mm), along the optical axis La, of the cover glass CG provided in the image pickup lens 1.

"Hyper focal distance": Hyper focal distance of the image pickup lens 1. The hyper focal distance is an object distance (a distance from a lens to an object whose image is to be taken) at which the lens is focused so that the depth of field extends to infinity.

"Object distance": Object distance.

"Design wave weight": Weighting of white light serving as a simulation light source (refer to the foregoing descriptions for detail).

As is clear from FIG. 13, both the image pickup lenses 100 and 200 have a diagonal angle of view of 65.0°. This means that the image pickup lens 1 is an image pickup lens having a wide angle of view.

Further, as is clear from FIG. 13, the total length of the optical system of the image pickup lens 200 is 3.014 mm, whereas the total length of the optical system of the image pickup lens 100 is 2.966 mm. That is, the image pickup lens 100 is lower in height than the image pickup lens 200.

(Various Values Pertaining to Entrance Pupil Diameter and Focal Length of Each Lens of Image Pickup Lens 1)

Figure 14:
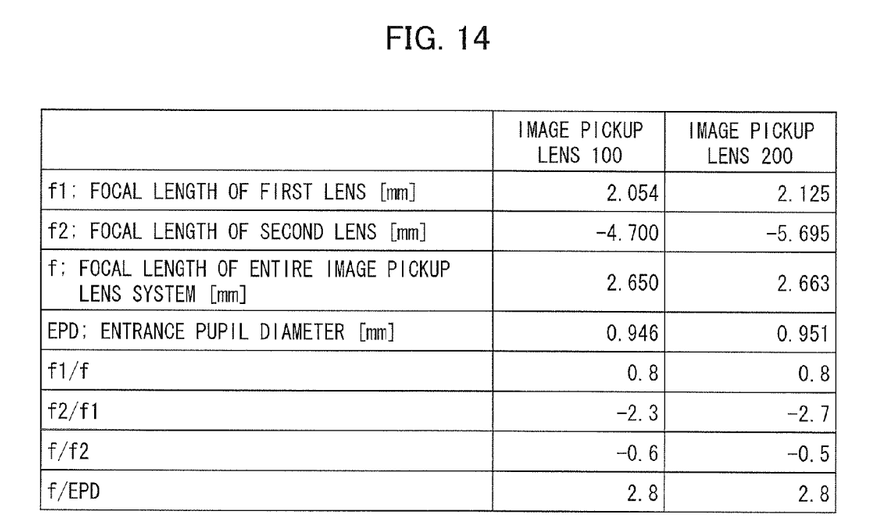
FIG. 14 is a table showing various numerical values pertaining to entrance pupil diameters and focal lengths of the image pickup lenses shown in FIGS. 1 and 2.

FIG. 14 is a table showing various numerical values pertaining to the entrance pupil diameter and the focal length of each lens of the image pickup lens 1.

FIG. 14 shows the following numerical values as to the image pickup lenses 100 and 200.

Focal length f1 of first lens L1 (unit: mm)
Focal length f2 of second lens L2 (unit: mm)
Focal length f of entire image pickup lens 1 system (unit: mm)
Entrance Pupil Diameter EPD of entire image pickup lens 1 system (unit: mm)
f1/f (Numerical value in the condition (A))
f2/f1 (Numerical value in the conditions (F) and (G))
f/f2 (Numerical value in the inequality (1))
f/EPD (Numerical value in the inequality (2))

The image pickup lens 200 has an f2/f1 of approximately −2.7, which does not satisfy the conditions (F) and (G). The image pickup lens 200 is capable of, even if the conditions (F) and (G) are not satisfied, achieving a high-resolution image pickup lens which is small in size and low in height.

Further, the image pickup lens 200 has a (n1−1)f/r1 of approximately −2.7, which does not satisfy the condition (B).

The image pickup lens 200 is capable of, even if the condition (B) is not satisfied, achieving a high-resolution image pickup lens which is small in size and low in height.

The image pickup lenses 100 and 200 each have an f/EPD of 2.8, which satisfies the inequality f/EPD<3.6. That is, both of them satisfy the inequality (2).

Further, the image pickup lens 100 has an f/f2 of approximately −0.6, and the image pickup lens 200 has an f/f2 of approximately −0.5. The image pickup lens 100 satisfies the inequality (1), whereas the image pickup lens 200 does not satisfy the inequality (1). As described earlier, the image pickup lens 100 that satisfies the inequality (1) can be configured to be lower in height than the image pickup lens 200 that does not satisfy the inequality (1). When the image pickup lens 1 satisfies the inequality (1) like above, the size and height of the image pickup lens 1 can be reduced by reducing the total length of the optical system of the image pickup lens 1.

[Embodiment 2]

Figure 15:
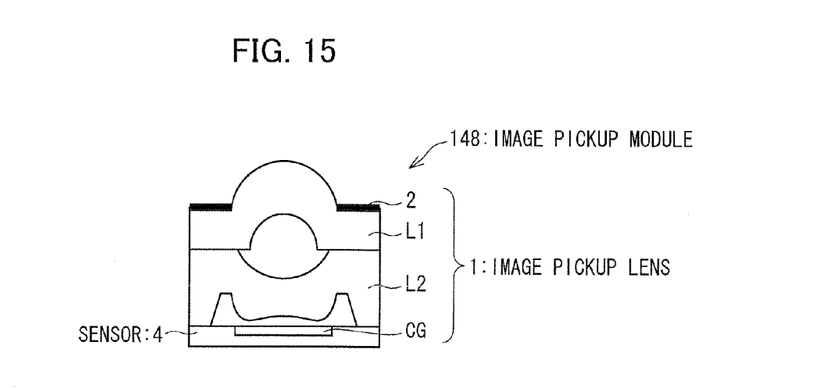
FIG. 15 is a cross-sectional view showing a configuration of an image pickup module in accordance with another embodiment of the present invention.

It is possible to configure an image pickup module 148 including (i) an image pickup lens 1 and (ii) a sensor (image pickup device) 4 which receives light representing an image formed by the image pickup lens 1 (see FIG. 15). The sensor 4 used here is for example a solid-state image pickup device such as a CCD (Charge Coupled Device) image sensor or a CMOS (Complementary Metal Oxide Semiconductor) image sensor.

The image pickup module 148 has a wide angle of view, has excellent optical characteristics, and is small in size and low in height. The image pickup module 148 is suitably applicable, in particular, to a compact image pickup apparatus to be connected to or mounted on a personal computer or a portable terminal (portable device).

Further, it is preferable that the image pickup lens of the present invention be configured such that the surface of the first lens, which surface faces toward the object, protrudes through the aperture diaphragm toward the object.

The configuration makes it possible to cause an entrance pupil of the image pickup lens to be closer to an image surface, and thus makes it easily to achieve a telecentric property of the image pickup lens. Hence, it is possible to properly correct aberrations, and thus possible to achieve an image pickup lens which is small in size and low in height.

Further, it is preferable that the image pickup module of the present invention be configured such that the image pickup device is a CCD image sensor or a CMOS image sensor.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to an image pickup lens and an image pickup module for use in, for example, portable terminals.

REFERENCE SIGNS LIST 1, 100, 200 Image pickup lens
2 Aperture diaphragm
3 Object
4 Sensor (image pickup device)
148 Image pickup module
L1 First lens
L2 Second lens
La Optical axis
S1 Surface of first lens which surface faces toward object
S2 Surface of first lens which surface faces toward image surface S3 Surface of second lens which surface faces toward object S4 Surface of second lens which surface faces toward image surface S7 Image surface c4 Central part p4 Peripheral Part

The invention claimed is:

1. An image pickup lens comprising:
lenses; and
an aperture diaphragm,
the number of the lenses being two,
one of the lenses being a first lens and the other being a second lens,
the aperture diaphragm, the first lens, and the second lens being arranged in this order from an object side to an image surface side,
the first lens (i) having positive refractive power and (ii) being a meniscus lens whose surface facing toward the object has a convex shape,
the second lens (a) having negative refractive power and (b) being a lens whose surface facing toward the object has a concave shape and whose surface facing toward the image surface is configured such that a central part has a concave shape and a peripheral part surrounding the central part has a convex shape, and
each of the first and second lenses
being configured such that a surface facing toward the object and a surface facing toward the image surface are both aspheric and
having an Abbe number of greater than 45,
said image pickup lens being configured to satisfy the following inequalities (1) and (2):

$$-0.62 < f/f2 < -0.55 \quad (1)$$

$$f/\text{EPD} < 3.6 \quad (2)$$

where f is focal length of an entire image pickup lens system, f2 is focal length of the second lens, and EPD is entrance pupil diameter of the entire image pickup lens system.

2. The image pickup lens as set forth in claim 1, wherein the surface of the first lens, which surface faces toward the object, protrudes through the aperture diaphragm toward the object.

3. An image pickup module comprising:
an image pickup lens; and
an image pickup device for receiving light representing an image formed by the image pickup lens,
the image pickup lens including
lenses, and
an aperture diaphragm,
the number of the lenses being two,
one of the lenses being a first lens and the other being a second lens,
the aperture diaphragm, the first lens, and the second lens being arranged in this order from an object side to an image surface side,
the first lens (i) having positive refractive power and (ii) being a meniscus lens whose surface facing toward the object has a convex shape,
the second lens (a) having negative refractive power and (b) being a lens whose surface facing toward the object has a concave shape and whose surface facing toward the image surface is configured such that a central part has a concave shape and a peripheral part surrounding the central part has a convex shape, and
each of the first and second lenses
being configured such that a surface facing toward the object and a surface facing toward the image surface are both aspheric and
having an Abbe number of greater than 45,
the image pickup lens being configured to satisfy the following inequalities (1) and (2):

$$-0.62 < f/f2 < -0.55 \quad (1)$$

$$f/\text{EPD} < 3.6 \quad (2)$$

where f is focal length of an entire image pickup lens system, f2 is focal length of the second lens, and EPD is entrance pupil diameter of the entire image pickup lens system.

4. The image pickup module as set forth in claim 3, wherein the image pickup device is a CCD (Charge Coupled Device) image sensor or a CMOS (Complementary Metal Oxide Semiconductor) image sensor.

* * * * *